US011663061B2

(12) United States Patent
Barthur

(10) Patent No.: US 11,663,061 B2
(45) Date of Patent: May 30, 2023

(54) ANOMALOUS BEHAVIOR DETECTION

(71) Applicant: H2O.ai Inc., Mountain View, CA (US)

(72) Inventor: Ashrith Barthur, San Francisco, CA (US)

(73) Assignee: H2O.ai Inc., Mountain View, CA (US)

(*) Notice: Subject to any disclaimer, the term of this patent is extended or adjusted under 35 U.S.C. 154(b) by 979 days.

(21) Appl. No.: 16/263,579

(22) Filed: Jan. 31, 2019

(65) Prior Publication Data
US 2020/0250477 A1 Aug. 6, 2020

(51) Int. Cl.
*G06F 17/00* (2019.01)
*G06F 11/07* (2006.01)
*G06F 11/30* (2006.01)
*G06F 9/54* (2006.01)
*G06N 20/00* (2019.01)
*G06F 18/214* (2023.01)

(52) U.S. Cl.
CPC .......... *G06F 11/0709* (2013.01); *G06F 9/542* (2013.01); *G06F 11/3006* (2013.01); *G06F 11/3072* (2013.01); *G06F 18/2148* (2023.01); *G06F 18/2155* (2023.01); *G06N 20/00* (2019.01)

(58) Field of Classification Search
CPC ............. G06F 11/3447; G06F 17/5022; G06F 17/5036; G06N 3/126; G06N 99/005
USPC .................. 706/12, 13; 703/13, 22
See application file for complete search history.

(56) References Cited

U.S. PATENT DOCUMENTS

| | | | |
|---|---|---|---|
| 7,562,814 B1 | 7/2009 | Shao | |
| 9,697,248 B1 | 7/2017 | Ahire | |
| 10,402,723 B1* | 9/2019 | Silberman | G06N 3/006 |
| 10,410,135 B2* | 9/2019 | Shumpert | G06N 20/00 |
| 10,536,344 B2* | 1/2020 | Mermoud | H04L 41/142 |
| 10,733,292 B2* | 8/2020 | Araujo | G06F 21/554 |
| 10,846,308 B2* | 11/2020 | Miller | G06F 16/285 |
| 11,151,165 B2* | 10/2021 | Guha | G06F 16/285 |
| 2004/0054499 A1 | 3/2004 | Starzyk | |
| 2013/0097103 A1 | 4/2013 | Chari | |
| 2014/0109223 A1 | 4/2014 | Jin | |
| 2018/0096261 A1* | 4/2018 | Chu | G06N 20/20 |
| 2018/0288063 A1 | 10/2018 | Koottayi | |

OTHER PUBLICATIONS

Thai T. Pham, Anomaly Detection in Bitcoin Network Using Unsupervised Learning Methods, Feb. 25, 2017, arXiv 2017.*

* cited by examiner

*Primary Examiner* — Andy Ho
(74) *Attorney, Agent, or Firm* — Van Pelt, Yi & James LLP

(57) ABSTRACT

A training dataset is used to train an unsupervised machine learning trained model. Corresponding gradient values are determined for a plurality of entries included in the training dataset using the trained unsupervised machine learning model. A first subset of the training dataset is selected based on the determined corresponding gradient values and a first threshold value selected from a set of threshold values. A labeled version of the selected first subset is used to train a first supervised machine learning model to detect one or more anomalies.

18 Claims, 5 Drawing Sheets

200 ⤴

|  | $F_1$ | $F_2$ | ... | $F_n$ |
|---|---|---|---|---|
| $M_1$ | $X_1$ | $Y_1$ | ... | $Z_1$ |
| $M_2$ | $X_2$ | $Y_2$ | ... | $Z_2$ |
| ... | ... | ... | ... | ... |
| $M_n$ | $X_n$ | $Y_n$ | ... | $Z_n$ |

|  | $F_1$ | $F_2$ | ... | $F_n$ | Prediction Label |
|---|---|---|---|---|---|
| $N_1$ | $A_1$ | $B_1$ | ... | $C_1$ | $P_1$ |
| $N_2$ | $A_2$ | $B_2$ | ... | $C_2$ | $P_2$ |
| ... | ... | ... | ... | ... | ... |
| $N_n$ | $A_n$ | $B_n$ | ... | $C_n$ | $P_n$ |

FIG. 2B

ANOMALOUS BEHAVIOR DETECTION

BACKGROUND OF THE INVENTION

A computing system may exhibit and/or experience anomalous behavior. In some scenarios, the anomalous behavior may negatively impact the computing system. For example, a user associated with the computing system may download software (e.g., malicious software) that causes a downgrade of the computing system performance. The amount of performance degradation may be considered to be anomalous behavior. The computing system may monitor system performance and indicate that the degraded system performance is anomalous.

In another example, a user associated with the computing system may access sensitive data stored by the computing system. Although the user may possess the credentials required to access such sensitive data, the user's access may be anomalous because the access occurs from a location and/or time that deviates from the user's normal behavior. The computing system may monitor user access patterns and indicate the user's access as being anomalous.

In some occasions, the computing system correctly indicates the system performance and/or the user's behavior as being anomalous. In other occasions, the computing system incorrectly indicates the system performance and/or the user's behavior as being anomalous.

BRIEF DESCRIPTION OF THE DRAWINGS

Various embodiments of the invention are disclosed in the following detailed description and the accompanying drawings.

FIG. 2A is a diagram illustrating an embodiment of an unsupervised training dataset.

FIG. 2B is a diagram illustrating an embodiment of a supervised dataset.

DETAILED DESCRIPTION

Figure 1:
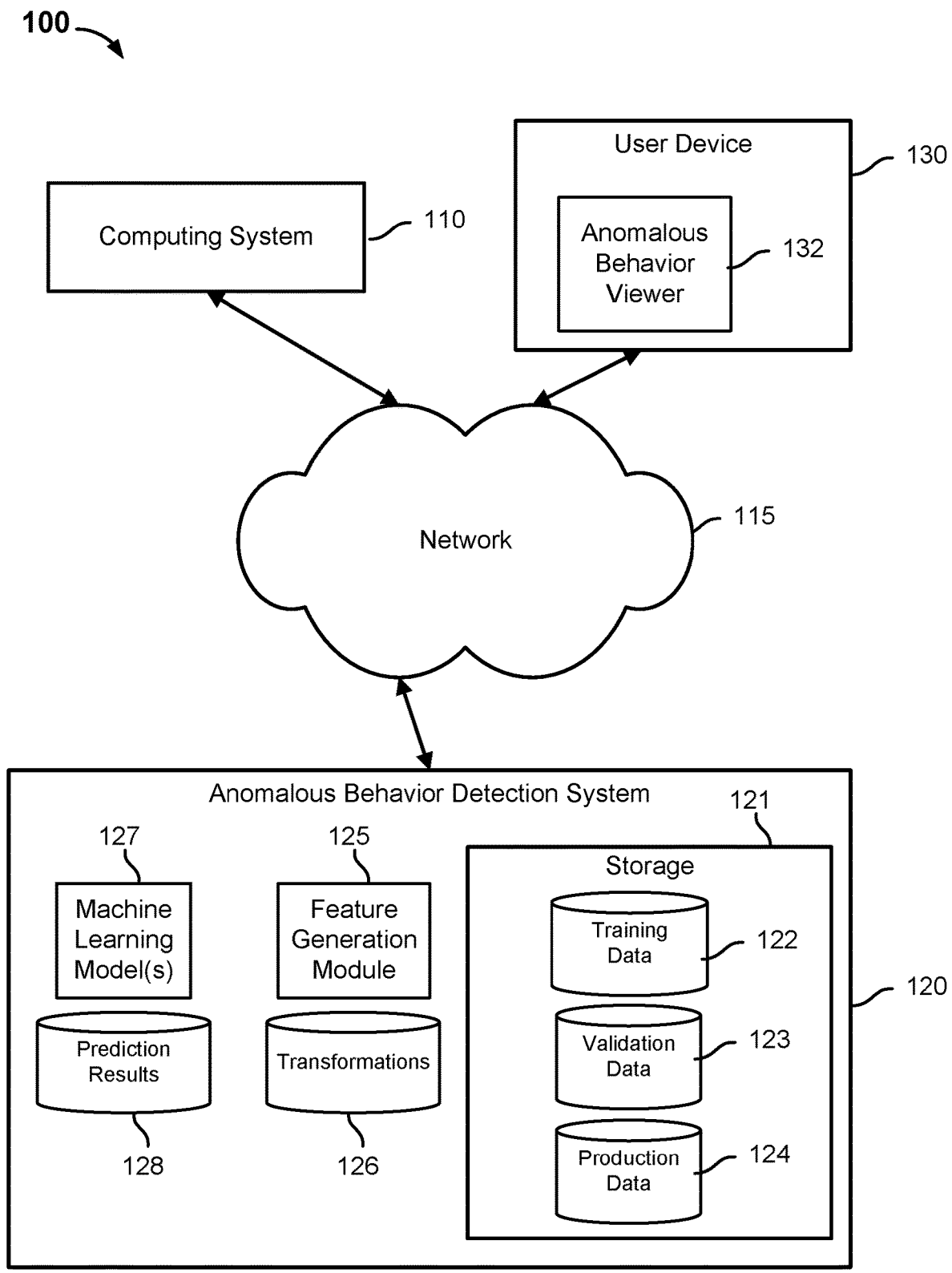
FIG. 1 is a block diagram of a system for detecting anomalous behavior in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A computing system may perform one or more events and store information associated with the one or more events. For example, the computing system may store in a log file the information associated with the one or more events. The information associated with the one or more events may include a time that a particular file was accessed, a particular time a system was accessed, an amount of time needed to perform a call, an amount of data that was downloaded, etc. A single piece of information associated with an event, by itself, may not indicate that the event is anomalous, but when considered in combination with other pieces of information associated with the event, may indicate that the event is anomalous. Furthermore, a single event, by itself, may not be indicative of anomalous behavior, but when considered in combination with one or more other events, the plurality of events may be considered to be anomalous.

A computing system may include an anomalous detection system to determine whether one or more events associated with the computing system are anomalous. One problem with anomalous detection systems is that the anomalous behavior may be a type of behavior that was not previously experienced by the computing system. The anomalous detection system may determine whether the behavior is normal or anomalous based on past behavior, however, such a determination may be inaccurate. For example, the anomalous detection system may determine behavior to be anomalous when the behavior is normal (e.g., false positive) or determine behavior to be normal when the behavior is anomalous (e.g., false negative).

Other systems may label some events and its associated data as being "normal" and other events and its associated data as being "anomalous." However, these systems also use previously detected anomalous behavior to detect future anomalous behavior. One deficiency in such systems is that the future anomalous behavior may not behave in a similar manner as the previously detected anomalous behavior.

Not detecting anomalous behavior at all or inaccurately determining whether behavior is anomalous may have serious consequences for a computing system. For example, the computing system may experience a security breach. An unauthorized user may access sensitive data. The unauthorized user may download and install software that infects the computing system and a network associated with the computing system with malicious software. The inability to detect anomalous behavior or the inability to accurately classify behavior as anomalous may prevent the computing system from implementing one or more remediation measures that may resolve or mitigate the damage.

A computing system may implement one or more supervised machine learning models to accurately detect and determine whether the one or more events associated with the computing system are anomalous. The one or more supervised machine learning models may be trained based on an output of a trained unsupervised machine learning model. An unsupervised training dataset may include a plurality of events and data associated with the plurality of events. The data associated with an event may include a plurality of features and corresponding feature values. For example, one of the features may be a data access time. Another feature may be a location associated with the data access. Another feature may be an amount of data that was downloaded from a database. Another feature may be an amount of time needed to perform a function call. Another feature may include a user account name. An entry of the unsupervised training dataset corresponds to one of the plurality of events.

The unsupervised training dataset may be used to train an unsupervised machine learning model (e.g., k-means). When an entry comprising a plurality of features and corresponding feature values are applied to the trained unsupervised machine learning model, the trained unsupervised machine learning model may be configured to output a gradient value that indicates how close the entry is to a group of entries included in the unsupervised training dataset. The unsupervised machine learning model may group a plurality of entries included in the unsupervised training dataset around a centroid. An output of the unsupervised machine learning model may cause one or more entries included in the unsupervised training dataset to be located away from the centroid (e.g., located more than a threshold distance away from the centroid). The output of the unsupervised machine learning model may generate a gradient range where some of the entries that are located away from the centroid may correspond to anomalous behavior and some of the entries that are located away from the centroid may correspond to normal behavior. For example, a plurality of entries of unsupervised training dataset may have a gradient value in the gradient range of 0.70-0.85. Some of the entries having a gradient value between 0.70 and 0.85 may correspond to normal behavior and some of the entries having a gradient value between 0.70 and 0.85 may correspond to anomalous behavior. Entries that have a gradient value within the normal gradient range maybe be selected and removed from the unsupervised training dataset.

A plurality of supervised machine learning models may be trained based on the gradient range. For example, a first threshold value may be selected and a first subset of the unsupervised training dataset may be used to train a first supervised machine learning model. The selected threshold value is a value included in the gradient range and labels the entries of the unsupervised training dataset. For example, entries having a gradient value below the selected threshold value may be labeled as being normal and entries having a gradient value above the selected threshold value may be labeled as being anomalous. The first subset of the unsupervised training dataset may correspond to entries that have a gradient value that is less than and greater than the selected threshold value (i.e., an entry with a gradient value equal to the selected threshold value is removed from the training dataset). In other embodiments, the first subset of the unsupervised training dataset correspond to entries that have a gradient value that is less than the selected threshold value and greater than the upper limit of the gradient range. In other embodiments, the first subset of the unsupervised training dataset correspond to entries that have a gradient value that is less than the selected threshold value and greater than a first upper threshold (e.g., another gradient value included in the gradient range). The entries included in a first subset of the unsupervised training dataset may be used to train a first supervised machine learning model. The first supervised machine learning model is trained to output labels that matches the labels associated with the entries included in the first subset of the unsupervised training dataset.

A supervised validation dataset may be applied to the first trained supervised machine learning model. The supervised validation dataset may be comprised of a plurality entries and corresponding labels associated with the entries. One or more performance metrics associated with the first trained supervised machine learning model may be determined. For example, a number of false positives predicted by the first trained supervised machine learning model, a number of true positives predicted by the first trained supervised machine learning model, a number of false negatives predicted by the first trained supervised machine learning model, and/or a number of true negatives predicted by the first trained supervised machine learning model may be determined. In other embodiments, a percentage of the total predictions that are false positives, a percentage of the total predictions that are true positives, a percentage of the total predictions that are false negatives, and/or a percentage of the total predictions that are true negatives, may be determined. The one or more performance metrics may be compared to one or more corresponding performance thresholds.

The above process may be repeated for one or more other supervised machine learning models. For example, a second threshold value may be selected and a second subset of the unsupervised training dataset may be used to train a second supervised machine learning model. The second subset of the unsupervised training dataset may correspond to entries that have a gradient value that is less than and greater than the second threshold value (i.e., an entry with a gradient value equal to the selected threshold value is removed from the training dataset). In other embodiments, the second subset of the unsupervised training dataset correspond to entries that have a gradient value that is less than the second threshold value and greater than the upper limit of the gradient range. In other embodiments, the second subset of the unsupervised training dataset correspond to entries that have a gradient value that is less than the second threshold value and greater than a second upper threshold (e.g., another gradient value included in the gradient range). The entries included in a second subset of the unsupervised training dataset may be used to train a second supervised machine learning model. The second supervised machine learning model may be trained to output labels that match the labels associated with the entries included in the second subset of the unsupervised training dataset. The supervised validation dataset may be applied to the second trained supervised machine learning model. One or more performance metrics associated with the second trained supervised machine learning model may be determined.

A group of supervised machine learning models may be trained and validated. The group of supervised machine learning models may be comprised of n supervised machine learning models. Each supervised machine learning model included in the group has one or more corresponding performance metrics. A subset of the plurality of supervised machine learning models may be selected based on a corresponding performance associated with a supervised machine learning model. For example, a supervised machine learning model may be selected in the event the supervised machine learning model predicts a lowest number of false positives, a lowest number of false negatives, a highest number of true positives, and/or a highest number of true negatives when compared to the other supervised machine learning models of the group.

The one or more selected supervised machine learning models may be used to detect anomalous behavior associated with a computer system. Event data associated with one or more events may be received from a computing system and applied to the one or more selected supervised machine learning models. The one or more selected supervised machine learning models may be configured to output a prediction label and associated statistical confidence that indicates whether the event is indicative of normal behavior or anomalous behavior. In the event a retained machine learning model outputs a prediction label that one or more events are anomalous behavior, a notification may be provided to a user associated with the computing system. The notification may include one or more recommended remediation measures associated with the detected anomalous behavior. For example, the one or more recommended remediation measures may include a recommendation that a user associated with the computing system modify (e.g., strengthen) the user's password, a recommendation that a software patch be applied to a user's device, a recommendation that the user's device be restored to a particular point in time, etc. A recommended remediation measure may correspond to the specific type of anomalous behavior detected.

A user associated with the computing system may implement the one or more recommended remediation measures. Using a combination of an unsupervised training dataset, an unsupervised machine learning model that enables the unsupervised training dataset to become a supervised training dataset, and using the supervised training dataset to train a supervised machine learning model, previously undetectable anomalous behavior may be detected and may enable anomalous behavior to be detected more accurately. This may allow the computing system to implement one or more remediation measures that may resolve or mitigate the damage associated with the anomalous behavior.

FIG. 1 is a block diagram illustrating a system for detecting anomalous behavior in accordance with some embodiments. In the example shown, the system 100 includes computing system 110, network 115, anomalous behavior detection system 120, and a user device 130.

Computing system 110 may be comprised of one or more servers, one or more storage devices, and/or a combination thereof. Computing system 110 may be part of a datacenter. Computing system 110 may be associated with an enterprise and store data associated with the enterprise. Computing system 110 may be configured to run a database application (e.g., SQL, Oracle DB, Sybase, Informix, MySQL, etc.) and to store the data associated with the database application. Computing system 110 may be configured to receive one or more commands and may be configured to perform one or more corresponding actions based on the one or more commands. Computing system 110 may be configured to store an event log that stores one or more events associated with computing system 110 and the associated data.

Computing system 110 may store an event log that includes information associated with the event, such as the filename, a length of time that the file was open, a user that accessed the file, a location of the user access, a type of access (e.g., read or write), a number of login attempts, whether the file is encrypted, an amount of data that was added to the file, an amount of data that was removed from the file, whether a copy of the file was saved, a permission level associated with the file, whether an application was installed on computing system 110, whether an application was deleted from computing system 110, etc.

The event log may store a sequence of events associated with a user. For example, the event log may store the one or more events associated with a user session. The event log may include a time and date of the user login, a sequence of the one or more files that the user accessed, a sequence of the one or more actions that the user performed with respect to the one or more files, a time and data of the user logout, etc.

Computing system 110 may be configured to provide to anomalous behavior detection system 120 the event log that is comprised of one or more events and the data associated with the one or more events. In some embodiments, the event log is provided on a periodic basis (e.g., hourly, daily, weekly, etc.). In other embodiments, the event log is provided after a threshold number of events are stored in the event log. In other embodiments, the event log is provided anomalous behavior detection system 120 in response to a user command. In some embodiments, anomalous behavior detection system 120 is located separate from computing system 110. Computing system 110 may provide the event log to anomalous behavior detection system 120 via network 115. Network 115 comprises one or more of the following: a local area network, a wide area network, a wired network, a wireless network, the Internet, an intranet, or any other appropriate communication network. In other embodiments, anomalous behavior detection system 120 is part of computing system 110.

Anomalous behavior detection system 120 may be hosted on one or more computers, one or more servers, one or more cloud-based servers, one or more containers, one or more virtual machines, or a combination thereof. Anomalous behavior detection system 120 may include storage 121, feature generation module 125, a transformation database 126, a plurality of machine learning models 127, and a prediction results database 128.

Computing system 110 may be configured to provide to anomalous behavior detection system 120 a set of training data 122. In other embodiments, a different computing system may provide to anomalous behavior detection system 120 a set of training data 122. The set of training data 122 may be comprised of a plurality of entries corresponding to events. An entry may be associated with one or more features and corresponding feature values. The set of training data 122 may include unsupervised training data. In other embodiments, the set of training data 122 includes supervised training data. Computing system 110 may be configured to provide to anomalous behavior detection system 120 a set of validation data 123. The set of validation data 123 may be comprised of a plurality of entries corresponding to events. An entry may be associated with one or more features and corresponding feature values. The set of validation data 123 may be supervised validation data. For example, a user associated with computing system 110 may label the plurality of events associated with the set of validation data 123 as "anomalous" or "normal." In other embodiments, a different computing system may provide to anomalous behavior detection system 120 the set of validation data 123. A user associated with the different computing system may label the events associated with the set of validation data 123 as "anomalous" or "normal."

Storage 121 may be configured to store the set of training data 122, the set of validation data 123, and a set of production data 124. The production dataset may be comprised of one or more events and data associated with the one or more events. Computing system 110 may provide anomalous behavior detection system 120 with the set of production data 124. In some embodiments, computing system 110 provides anomalous behavior detection system 120 a dataset. A portion of the dataset may be used as training data 122 and a portion of the dataset may be used as validation data 123.

Feature generation module 125 is configured to generate one or more new features based on the features included in the dataset received from storage system 110. The one or more new features may be used to train a supervised machine learning model or an unsupervised machine learning model. Feature generation module 125 may select a transformation from transformations 126 and apply the selected transformation to one or more features and their corresponding feature values. In some embodiments, a feature undergoes a transformation to generate a new feature. In other embodiments, a plurality of features undergo a transformation to generate a new feature. The transformers may include a filter transformer, a frequent transformer, a bulk interactions transformer, a truncated SVD numeric transformer, a cross validation target encoding, cross validation categorical to numeric encoding transformer, a dates transformer, a date polar transformer, a text transformer, a categorical target encoding transformer, a numeric to categorical target encoding transformer, a cluster target encoding transformer, a cluster distance transformer, a weight of evidence, and/or a numeric to categorical weight of evidence transformer.

The filter transformer counts each numeric value in the dataset. The frequent transformer counts each categorical value in the dataset. This count can be either the raw count or the normalized count. The bulk interactions transformer will add, divide, multiply, and/or subtract two columns in the feature dataset. The truncated singular value decomposition (SVD) numeric transformer trains on a selected numeric columns in the dataset. The components of the truncated SVD will be new features. The cross validation target encoding is done on a categorical column. The cross validation categorical to numeric encode transformer converts a categorical column to a numeric column. Cross validation encoding is done on the categorical column. The dates transformer retrieves any data values (e.g., year, quarter, month, day, day of year, week, week day, hour, minute, second, etc.) into a numeric value. The date polar transformer expands the date using polar coordinates. The date transformer will only expand the date into different units, for example month. This does not capture the similarity between the months December and January (12 and 1) or the hours 23 and 0. The polar coordinates capture the similarity between these cases by representing the unit of the data as a point in a cycle. The text transformer transforms a text column using TFIDF (term frequency-inverse document frequency) or count (count of the word). This may be followed by dimensionality reduction using truncated SVD. The categorical target encoding transformer may perform cross validation target encoding on a categorical column. The numeric to categorical target encoding transformer converts a numeric column to categorical by binning. Cross validation target encoding is done on the binned numeric column. The cluster target encoding transformer clusters selected columns in the data and target encoding is done on the cluster ID. The cluster distance transformer clusters selected columns in the data and the distance to a chosen cluster center is calculated. A weight of evidence creates likelihood type of features using the weights of evidence (WOE) transformation method. The weight of evidence tells the predictive power of an independent variable in relation to the dependent variable.

A set of features might also be includes that builds the relationship between computers, devices, and equipment in the network. The features might be numerical or a categorical representation of these interactions. For example, what is the rate at which the computer sends out packets to the switch/hub. What is the rate at which the switch sends out the packet to a specific router. A categorical feature example would be what are the kinds of communications that occur between the computer, switch and the router, or any other given equipment, that is capable of receiving and responding to communication. These categories could be types of protocols at any layer of the OSI stack.

Similarly, features could also be built based on the interactions between these composite systems. These systems would be classified as composite as they are not communicating merely by the presence of hardware but because of the existence of a operating system, application, and data—that could be user input or system inputs.

Anomalous behavior detection system 120 may be configured to use an unsupervised training dataset to train an unsupervised machine learning model (e.g., k-means, SVMs). The unsupervised training dataset is comprised of a plurality of entries having one or more features and corresponding feature values. In some embodiments, the training dataset is a supervised training dataset and a label feature and corresponding label value is removed from the training dataset to make the supervised training dataset an unsupervised training dataset. An entry of the unsupervised training dataset may correspond to an event associated with computing system 110. When an entry comprising a plurality of features and corresponding feature values is applied to the trained unsupervised machine learning model, the trained unsupervised machine learning model is configured to output a gradient value that indicates how close the entry is to a group of entries included in the unsupervised training dataset. In some embodiments, a subset of the features and associated feature values are applied to the trained unsupervised machine learning model. The unsupervised machine learning model may group a plurality of entries included in the unsupervised training dataset around a centroid. An output of the unsupervised machine learning model may cause one or more entries included in the unsupervised training dataset to be located away from the centroid (e.g., located more than a threshold distance away from the centroid). The output of the unsupervised machine learning model may generate a gradient range where some of the entries that are located away from the centroid may correspond to anomalous behavior and some of the entries that are located away from the centroid may correspond to normal behavior. The gradient range includes a lower limit and an upper limit. For example, a plurality of entries of unsupervised training dataset may have a gradient value in the gradient range of 0.70-0.85. Some of the entries having a gradient value between 0.70 and 0.85 may correspond to normal behavior and some of the entries having a gradient value between 0.70 and 0.85 may correspond to anomalous behavior. Anomalous behavior detection system 120 may be configured to select entries that have a gradient value within the gradient range and to remove the selected entries from the unsupervised training dataset.

A plurality of machine learning models 127 may be trained based on the gradient range. Anomalous behavior detection platform 120 may select a threshold based on the gradient range. The threshold may be the lower limit of the gradient range, a value within the gradient range, or the upper limit of the gradient range. Anomalous behavior detection platform 120 may generate one or more supervised machine learning models for the selected gradient threshold. For example, the one or more supervised machine learning models may be generated using one or more machine learning algorithms, such as support vector machines, linear regression, logistic regression, decision trees, naïve bayes classification, linear discriminant analysis, least squares regression, neural networks, deep learning, gradient boosting machine, generalized linear model etc. For example, for the selected threshold, a first machine learning model may be generated using a first machine learning algorithm, a second machine learning model may be generated using a second machine learning algorithm, . . . , and an nth machine learning model may be generated using an nth machine learning algorithm.

The selected threshold value is a value included in the gradient range and enables the entries of the unsupervised training dataset to be labeled. For example, entries having a gradient value below the selected threshold value may be labeled as being normal and entries having a gradient value above the selected threshold value may be labeled as being anomalous. A subset of the unsupervised training dataset may be used to train a supervised machine learning model. The subset of the unsupervised training dataset may correspond to entries that have a gradient value that is less than and greater than the selected threshold value (i.e., an entry with a gradient value equal to the selected threshold value is removed from the training dataset). In other embodiments, the subset of the unsupervised training dataset correspond to entries that have a gradient value that is less than the selected threshold value and greater than the upper limit of the gradient range. In other embodiments, the subset of the unsupervised training dataset correspond to entries that have a gradient value that is less than the selected threshold value and greater than a first upper threshold (e.g., another gradient value included in the gradient range). The supervised machine learning model may be trained to output labels that match the labels associated with the entries included in the subset of the unsupervised training dataset.

Anomalous behavior detection system 120 may be configured to apply the set of validation data 123 to a trained supervised machine learning model. The supervised validation dataset may be comprised of a plurality of entries that include one or more features and corresponding feature values, and corresponding labels associated with the entries. The trained supervised machine learning model may be configured to output a prediction label for each entry include in the supervised validation dataset.

Anomalous behavior detection system 120 may be configured to determine one or more performance metrics associated with a trained supervised machine learning model. The one or more performance metrics are based on a comparison between a label associated with an entry in the validation dataset and a prediction label outputted by a trained supervised machine learning model. For example, a number of false positives predicted by a trained supervised machine learning model, a number of true positives predicted by the trained supervised machine learning model, a number of false negatives predicted by the trained supervised machine learning model, and/or a number of true negatives predicted by the trained supervised machine learning model may be determined. In other embodiments, a percentage of the total predictions that are false positives, a percentage of the total predictions that are true positives, a percentage of the total predictions that are false negatives, and/or a percentage of the total predictions that are true negatives, may be determined. The one or more performance metrics may be compared to one or more corresponding performance thresholds. The results of the determination may be stored in prediction results database 128.

The above process may be repeated for a plurality of different thresholds. For example, one or more supervised machine learning models may be trained based on a second threshold and a second subset of the unsupervised training dataset, and validated using the set of validation data, one or more supervised machined learning models may be trained based on third threshold and a third subset of the unsupervised training dataset and validated using the set of validation data, . . . , and one or more supervised machine learning models may be trained based on an nth threshold and an nth subset of the unsupervised training dataset and validated using the set of validation data. The second subset of the unsupervised training dataset may correspond to entries that have a gradient value that is less than and greater than the second threshold value (i.e., an entry with a gradient value equal to the second threshold value is removed from the training dataset). In other embodiments, the second subset of the unsupervised training dataset correspond to entries that have a gradient value that is less than the second threshold value and greater than the upper limit of the gradient range. In other embodiments, the second subset of the unsupervised training dataset correspond to entries that have a gradient value that is less than the second threshold value and greater than a second upper threshold (e.g., another gradient value included in the gradient range).

The third subset of the unsupervised training dataset may correspond to entries that have a gradient value that is less than and greater than the third threshold value (i.e., an entry with a gradient value equal to the third threshold value is removed from the training dataset). In other embodiments, the third subset of the unsupervised training dataset correspond to entries that have a gradient value that is less than the third threshold value and greater than the upper limit of the gradient range. In other embodiments, the third subset of the unsupervised training dataset correspond to entries that have a gradient value that is less than the third threshold value and greater than a third upper threshold (e.g., another gradient value included in the gradient range).

The nth subset of the unsupervised training dataset may correspond to entries that have a gradient value that is less than and greater than the nth threshold value (i.e., an entry with a gradient value equal to the nth threshold value is removed from the training dataset). In other embodiments, the nth subset of the unsupervised training dataset correspond to entries that have a gradient value that is less than the nth threshold value and greater than the upper limit of the gradient range. In other embodiments, the nth subset of the unsupervised training dataset correspond to entries that have a gradient value that is less than the nth threshold value and greater than a nth upper threshold (e.g., another gradient value included in the gradient range).

Anomalous behavior detection system 120 may determine one or more performance metrics for each of the trained supervised machine learning models. A subset of the plurality of supervised machine learning models may be selected based on a corresponding performance associated with a supervised machine learning model. For example, a supervised machine learning model may be selected in the event the supervised machine learning model predicts a lowest number of false positives, a lowest number of false negatives, a highest number of true positives, and/or a highest number of true negatives when compared to the other trained supervised machine learning models of the group.

Anomalous behavior detection system 120 may apply the set of production data 124 to the one or more selected trained supervised machine learning models. The one or more selected supervised machine learning models may be configured to output a prediction label that indicates whether an entry included in the set of production data 124 is indicative of normal behavior or anomalous behavior. In the event a selected trained supervised machine learning model outputs a prediction label that one or more entries are indicative of anomalous behavior, anomalous behavior detection system 120 may be configured to provide to anomalous behavior viewer 132 of user device 130 via network 115 a notification. User device 130 may be a personal computer, a laptop computer, a desktop computer, a tablet, a digital assistant, a server, a mobile phone, a smartphone, a smart television, a smart electronic device, etc. User device 130 may include an anomalous behavior viewer 132. Anomalous behavior viewer 132 may be configured to provide via a user interface the notification provided by anomalous behavior detection system 120. The notification may indicate that anomalous behavior was detected. The notification may indicate the one or more events that are indicative of anomalous behavior. The notification may include one or more reason codes why the one or more events are indicative of anomalous behavior. For example, the one or more reason codes may indicate a feature and its corresponding value as being one of the reasons why an event was predicted as being anomalous. The notification may include one or more recommended remediation measures associated with the detected anomalous behavior. For example, the one or more recommended remediation measures may include a recommendation that a user associated with the computing system modify (e.g., strengthen) the user's password, a recommendation that a software patch be applied to a user's device, a recommendation that the user's device be restored to a particular point in time, etc. A recommended remediation measure may correspond to the specific type of anomalous behavior detected. In response to receiving the notification, a user associated with user device 130 may cause the one or more remediation measures to be implemented.

Using a combination of an unsupervised training dataset, an unsupervised machine learning model that enables the unsupervised training dataset to become a supervised training dataset, and using the supervised training dataset to train a supervised machine learning model, previously undetectable anomalous behavior may be detected and may enable anomalous behavior to be detected more accurately. This may allow computing system 110 to implement one or more remediation measures that may resolve or mitigate the damage associated with the anomalous behavior.

FIG. 2A is a diagram illustrating an embodiment of an unsupervised training dataset. Unsupervised training dataset 200 may be stored by system, such as computing system 110 or anomalous behavior detection system 120. Unsupervised training dataset 200 may be implemented by an anomalous behavior detection system to train one or more unsupervised machine learning models (e.g., k-means, SVMs) associated with the anomalous behavior detection system. A trained unsupervised machine learning model may be configured to output a gradient value that indicates how close an entry is to a group of entries included in the unsupervised training dataset 200.

In the example shown, unsupervised training dataset 200 includes entries $M_1, M_2 \ldots M_n$. Each entry is comprised of one or more features having a corresponding feature value. For example, entry $M_1$ is comprised of features $F_1, F_2 \ldots F_n$ that have corresponding feature values of $X_1, Y_1 \ldots Z_1$. Entry $M_2$ is comprised of features $F_1, F_2 \ldots F_n$ that have corresponding feature values of $X_2, Y_2 \ldots Z_2$. Entry $M_n$ is comprised of features $F_1, F_2 \ldots F_n$ that have corresponding feature values of $X_n, Y_n \ldots Z_n$. In some embodiments, a feature value may correspond to the actual value of a feature (e.g., time accessed=10:13 pm). In other embodiments, a feature value may correspond to one of a ranges of values (e.g., a value of "2" indicates a permission level associated with a user login). In other embodiments, a feature value may correspond to one of the possible non-numerical values (e.g, "0"=male, "1"=female). In other embodiments, the feature value may be a text string (e.g., "John Smith," "filename.txt").

The set of features $X_1, Y_1 \ldots Z_1$ may be filtered to include a set of representative features (i.e., a subset of the initial set of features). A machine learning model may be trained using the set of features $X_1, Y_1 \ldots Z_1$ or a set of filtered features.

FIG. 2B is a diagram illustrating an embodiment of a supervised dataset. Supervised dataset 250 may be stored by system, such as computing system 110 or anomalous behavior detection system 120. In some embodiments, supervised dataset 250 may be implemented by an anomalous behavior detection system to train one or more supervised machine learning models associated with the anomalous behavior detection system. A trained supervised machine learning model may be configured to output a prediction label that indicates whether an event or sequence of events are indicative of anomalous behavior.

In other embodiments, supervised dataset 250 may be implemented by an anomalous behavior detection system to validate one or more trained supervised machine learning models associated with the anomalous behavior detection system.

In some embodiments, supervised dataset 250 may be sorted into training data and validation data.

In the example shown, supervised dataset 250 includes entries $N_1, N_2 \ldots N_n$. Each entry is comprised of one or more features having a corresponding feature value. For example, entry $N_1$ is comprised of features $F_1, F_2 \ldots F_n$ that have corresponding feature values of $A_1, B_1 \ldots C_1$. Entry $N_2$ is comprised of features $F_1, F_2 \ldots F_n$ that have corresponding feature values of $A_2, B_2 \ldots C_2$. Entry $N_n$ is comprised of features $F_1, F_2 \ldots F_n$ that have corresponding feature values of $A_n, B_n \ldots C_n$. In some embodiments, a feature value may correspond to the actual value of a feature (e.g., time accessed=10:13 pm). In other embodiments, a feature value may correspond to one of a ranges of values (e.g., a value of "2" indicates a permission level associated with a user login). In other embodiments, a feature value may correspond to one of the possible non-numerical values (e.g, "0"=male, "1"=female). In other embodiments, the feature value may be a text string (e.g., "John Smith," "filename.txt").

Each entry may have a corresponding prediction label. For example, entries $A_1, A_2 \ldots A_n$ may have a corresponding prediction label of $P_1, P_2 \ldots P_n$, respectively. The prediction label may indicate whether a corresponding entry is indicative of anomalous behavior. The prediction label may indicate a probability that a corresponding entry is indicative of anomalous behavior.

In some embodiments, an unsupervised training dataset is used to train an unsupervised machine learning model. The unsupervised machine learning model may output a corresponding gradient value for an entry of an unsupervised training dataset. The output of the unsupervised machine learning model may generate a gradient range where some of the entries that are located away from a centroid may correspond to anomalous behavior and some of the entries that are located away from the centroid may correspond to normal behavior. A threshold value may be selected. An entry having a gradient value that is less than the threshold value may be labeled as being normal and an entry having a gradient value that is more than the threshold value and exceeds an upper limit of a gradient range may be labeled as being anomalous. Supervised training dataset 250 may correspond to a result of applying a gradient threshold value to an unsupervised dataset, for example, unsupervised dataset 200. The set of features $A_1$, $B_1$ . . . $C_1$ may be filtered to include a set of representative features (i.e., a subset of the initial set of features). A supervised machine learning model may be trained using the set of features $A_1$, $B_1$ . . . $C_1$ or a set of filtered features.

In other embodiments, supervised dataset 250 corresponds to validation data. A trained supervised machine learning model may be validated to see if its corresponding prediction label matches a predication label included in the input dataset. A trained supervised machine learning machine may be validated in the event one or more performance metrics associated with its predication labels is greater than or equal to a performance score threshold. Otherwise, the trained supervised machine learning model may be retrained. For example, a number of false positives predicted by the trained supervised machine learning model, a number of true positives predicted by the trained supervised machine learning model, a number of false negatives predicted by the trained supervised machine learning model, and/or a number of true negatives predicted by the trained supervised machine learning model may be determined. In other embodiments, a percentage of the total predictions that are false positives, a percentage of the total predictions that are true positives, a percentage of the total predictions that are false negatives, and/or a percentage of the total predictions that are true negatives, may be determined.

Figure 3:
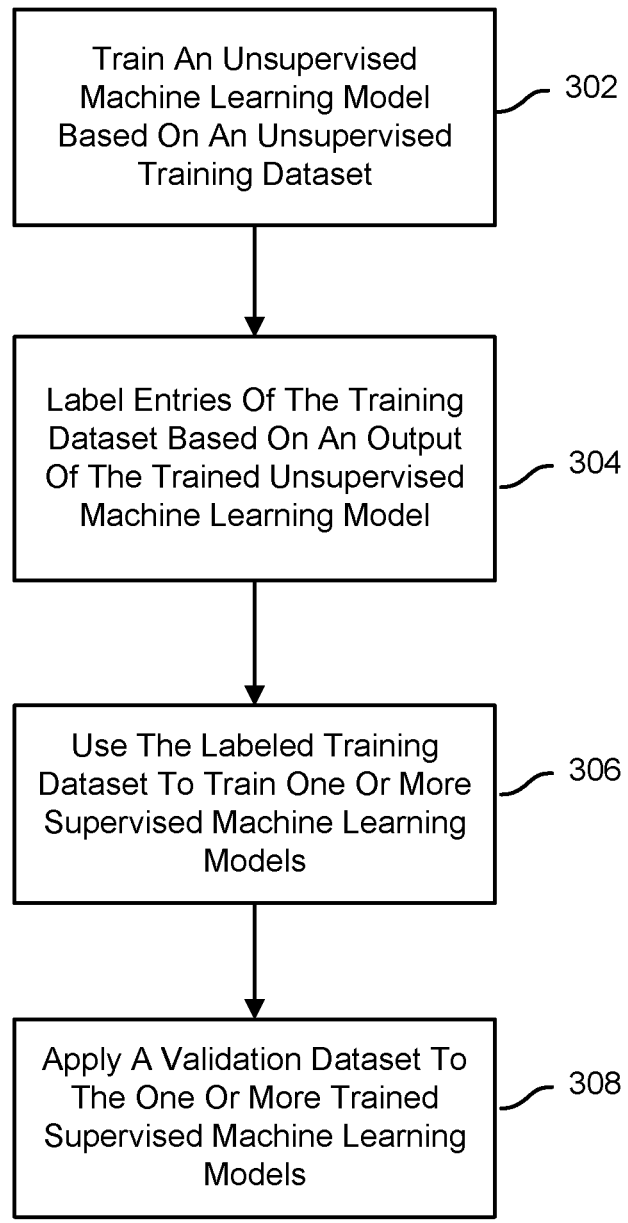
FIG. 3 is a flow chart illustrating a process for training one or more machine learning models to detect anomalous behavior in accordance with some embodiments.

FIG. 3 is a flow chart illustrating a process for training one or more machine learning models to detect anomalous behavior in accordance with some embodiments. In the example shown, process 300 may be performed by a system, such as anomalous behavior detection system 120.

At 302, an unsupervised machine learning model is trained based on an unsupervised training dataset. The unsupervised training dataset may be used to train an unsupervised machine learning model (e.g., k-means, SVMs). When an entry comprising a plurality features and corresponding feature values is applied to the trained unsupervised machine learning mode, the trained unsupervised machine learning model is configured output a gradient value that indicates how close the entry is to a group of entries included in the unsupervised training dataset.

The unsupervised machine learning model may group a plurality of entries included in the unsupervised training dataset around a centroid. An output of the unsupervised machine learning model may cause one or more entries included in the unsupervised training dataset to be located away from the centroid. The output of the unsupervised machine learning model may generate a gradient range where some of the entries that are located away from the centroid may correspond to anomalous behavior and some of the entries that are located away from the centroid may correspond to normal behavior. For example, a plurality of entries of unsupervised training dataset may have a gradient value in the gradient range of 0.70-0.85. Some of the entries having a gradient value between 0.70 and 0.85 may correspond to normal behavior and some of the entries having a gradient value between 0.70 and 0.85 may correspond to anomalous behavior. Entries that have a gradient value within the gradient range maybe be selected and removed from the unsupervised training dataset.

At 304, entries of the unsupervised training dataset are labeled based on an output of the trained unsupervised machine learning model. A threshold value may be selected. The selected threshold value is a value included in the gradient range and may enable the unsupervised training dataset to become a supervised training dataset. For example, entries having a gradient value below the selected threshold value may be labeled as being normal and entries having a gradient value above the selected threshold value may be labeled as being anomalous.

At 306, the labeled training dataset is used to train one or more supervised machine learning models. Entries that have a gradient value greater than the selected threshold value and less than or equal to the upper limit of the gradient range maybe be selected and removed from the training dataset. The entries included in a subset of the unsupervised training dataset may be used to train a supervised machine learning model. The subset is comprised of entries of the unsupervised training dataset that were not removed. The subset of the unsupervised training dataset may correspond to entries that have a gradient value that is less than and greater than the selected threshold value (i.e., an entry with a gradient value equal to the selected threshold value is removed from the training dataset). In other embodiments, the subset of the unsupervised training dataset correspond to entries that have a gradient value that is less than the selected threshold value and greater than the upper limit of the gradient range. In other embodiments, the subset of the unsupervised training dataset correspond to entries that have a gradient value that is less than the selected threshold value and greater than an upper threshold (e.g., another gradient value included in the gradient range). The supervised machine learning model is trained to output labels that match the labels associated with the entries included in the subset of the unsupervised training dataset.

The one or more supervised machine learning models may be generated using one or more machine learning algorithms, such as support vector machines, linear regression, logistic regression, decision trees, naïve bayes classification, linear discriminant analysis, least squares regression, neural networks, deep learning, gradient boosting machine, generalized linear model etc. For the selected threshold, a first machine learning model may be generated using a first machine learning algorithm, a second machine learning model may be generated using a second machine learning algorithm, and an nth machine learning model may be generated using an nth machine learning algorithm.

At 308, a supervised validation dataset is applied to the one or more trained supervised machine learning models. The supervised validation dataset may be comprised of a plurality entries. Each entry may be associated with one or more features and corresponding feature values. Each entry may also have a corresponding label that indicates whether the entry is indicative of normal behavior or anomalous behavior.

Steps 304-308 may be repeated for one or more different threshold values. A threshold value is a value included in the gradient range. For example, one or more supervised machine learning models may be trained based on a second threshold and a second subset of the unsupervised training dataset, and validated using the set of validation data, one or more supervised machined learning models may be trained based on third threshold and a third subset of the unsupervised training dataset and validated using the set of validation data, . . . , and one or more supervised machine learning models may be trained based on an nth threshold and an nth subset of the unsupervised training dataset and validated using the set of validation data.

The second subset of the unsupervised training dataset may correspond to entries that have a gradient value that is less than and greater than the second threshold value (i.e., an entry with a gradient value equal to the second threshold value is removed from the training dataset). In other embodiments, the second subset of the unsupervised training dataset correspond to entries that have a gradient value that is less than the second threshold value and greater than the upper limit of the gradient range. In other embodiments, the second subset of the unsupervised training dataset correspond to entries that have a gradient value that is less than the second threshold value and greater than a second upper threshold (e.g., another gradient value included in the gradient range).

The third subset of the unsupervised training dataset may correspond to entries that have a gradient value that is less than and greater than the third threshold value (i.e., an entry with a gradient value equal to the third threshold value is removed from the training dataset). In other embodiments, the third subset of the unsupervised training dataset correspond to entries that have a gradient value that is less than the third threshold value and greater than the upper limit of the gradient range. In other embodiments, the third subset of the unsupervised training dataset correspond to entries that have a gradient value that is less than the third threshold value and greater than a third upper threshold (e.g., another gradient value included in the gradient range).

The nth subset of the unsupervised training dataset may correspond to entries that have a gradient value that is less than and greater than the nth threshold value (i.e., an entry with a gradient value equal to the nth threshold value is removed from the training dataset). In other embodiments, the nth subset of the unsupervised training dataset correspond to entries that have a gradient value that is less than the nth threshold value and greater than the upper limit of the gradient range. In other embodiments, the nth subset of the unsupervised training dataset correspond to entries that have a gradient value that is less than the nth threshold value and greater than a nth upper threshold (e.g., another gradient value included in the gradient range).

Figure 4:
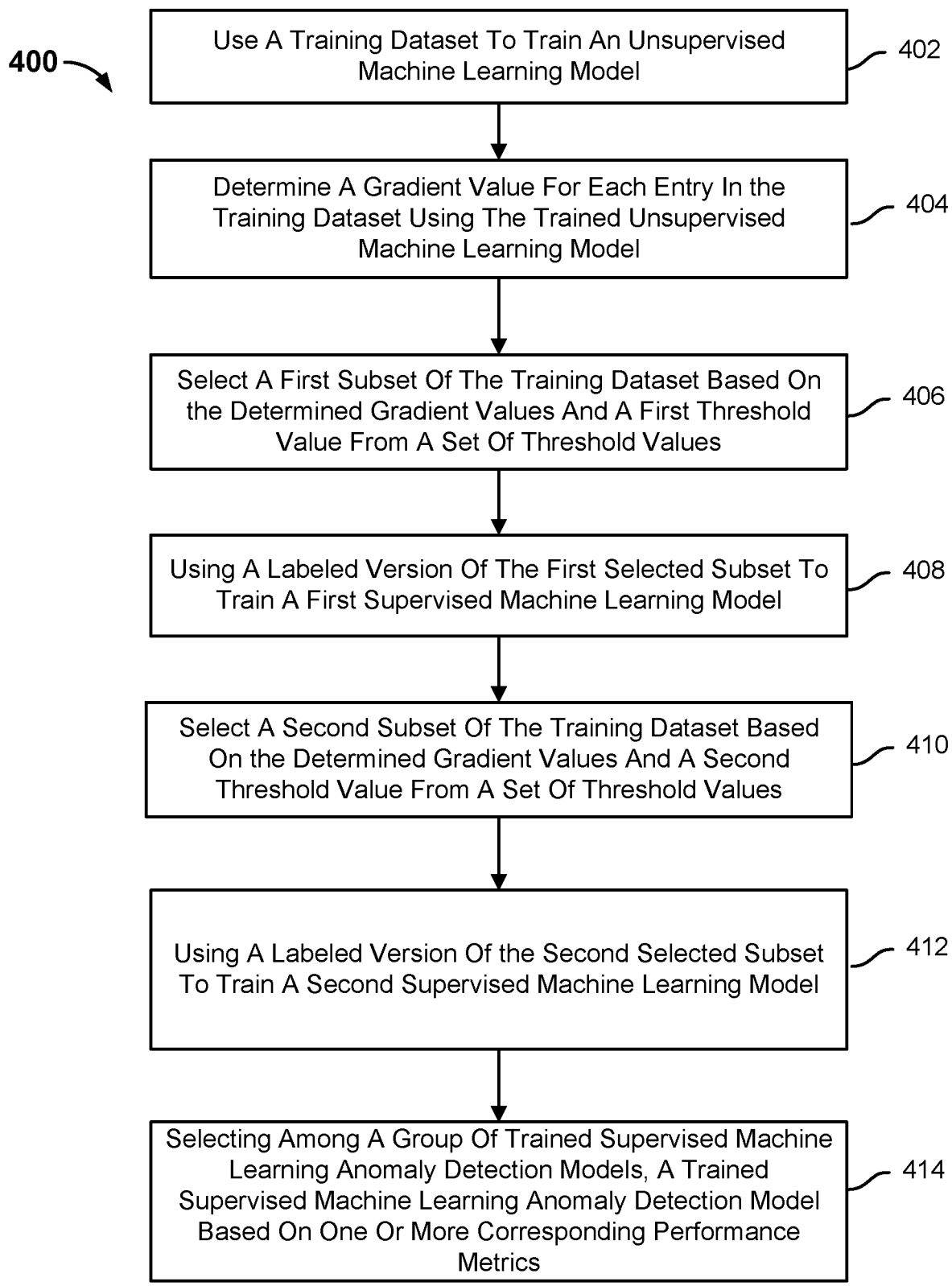
FIG. 4 is flow chart illustrating a process for selecting a machine learning model to perform anomaly detection in accordance with some embodiments.

FIG. 4 is flow chart illustrating a process for selecting a machine learning model to perform anomaly detection in accordance with some embodiments. In the example shown, process 400 may be performed by a system, such as anomalous behavior detection system 120.

At 402, a training dataset is used to train an unsupervised machine learning model. The training dataset may be an unsupervised training dataset. The unsupervised machine learning model may be a clustering algorithm, such as a k-means clustering algorithm.

At 404, a gradient value is determined, for each entry in the training dataset, using the trained unsupervised machine learning model. When an entry comprising a plurality of features and corresponding feature values is applied to the trained unsupervised machine learning model, the trained unsupervised machine learning model is configured output a gradient value that indicates how close the entry is to a group of entries included in the unsupervised training dataset. An output of the unsupervised machine learning model may group a plurality of entries included in the unsupervised training dataset around a centroid and may cause one or more entries included in the unsupervised training dataset to be located away from the centroid. At 406, a first subset of the training dataset is selected based on the determined gradient values and a first threshold value is selected from a set of threshold values. The output of the unsupervised machine learning model may generate a gradient range where some of the entries that are located away from the centroid may correspond to anomalous behavior and some of the entries that are located away from the centroid may correspond to normal behavior. The first threshold value corresponds to a value included in the gradient range. The first subset of the training dataset may correspond to entries that have a gradient value that is less than and greater than the first threshold value (i.e., an entry with a gradient value equal to the first threshold value is removed from the training dataset). In other embodiments, the first subset of the training dataset correspond to entries that have a gradient value that is less than the first threshold value and greater than the upper limit of the gradient range. In other embodiments, the first subset of the training dataset correspond to entries that have a gradient value that is less than the first threshold value and greater than a first upper threshold (e.g., another gradient value included in the gradient range).

At 408, a labeled version of the first selected subset is used to train a first supervised machine learning model. Entries having a gradient value below the first selected threshold value may be labeled as being normal and entries having a gradient value above the first selected threshold value may be labeled as being anomalous. The supervised machine learning model may be trained to output labels that match the labels associated with the entries included in the labeled version of the first selected subset.

At 410, a second subset of the training dataset is selected based on the determined gradient values and a second threshold value is selected from the set of threshold values. The second threshold value corresponds to a value included in the gradient range. In some embodiments, the second threshold value is greater than the first threshold value. In other embodiments, the second threshold value is less than the first threshold value. The second subset of the training dataset may correspond to entries that have a gradient value that is less than and greater than the second threshold value (i.e., an entry with a gradient value equal to the selected threshold value is removed from the training dataset). In other embodiments, the second subset of the training dataset correspond to entries that have a gradient value that is less than the second threshold value and greater than the upper limit of the gradient range. In other embodiments, the second subset of the training dataset correspond to entries that have a gradient value that is less than the second threshold value and greater than a second upper threshold (e.g., another gradient value included in the gradient range).

The second subset of the training dataset may correspond to entries that have a gradient value that is less than the second threshold value and greater than an upper limit of the gradient range. In other embodiments, the second subset of the training dataset corresponds to entries that have a gradient value that is less than the second threshold value and greater than a lower limit of the gradient range.

In some embodiments, the second subset of the training dataset includes values of the training dataset that were not included in the first subset of the training dataset.

At 412, a labeled version of the second selected subset is used to train a second supervised machine learning model. Entries having a gradient value below the second selected threshold value may be labeled as being normal and entries having a gradient value above the second selected threshold value may be labeled as being anomalous. The supervised machine learning model is trained to output labels that match the labels associated with the entries included in the labeled version of the second selected subset.

One or more other supervised machine learning models may be trained using one or more corresponding threshold values and one or more corresponding selected subsets of the training dataset. For example, a third supervised machined learning model may be trained based on a third threshold and a third subset of the unsupervised training dataset, . . . , and an nth supervised machine learning model may be trained based on an nth threshold and an nth subset of the unsupervised training dataset and validated using the set of validation data.

At 414, a trained supervised machine learning model is selected among a group of trained supervised machine learning models based on one or more corresponding performance metrics. A supervised validation dataset may be applied to each of the trained supervised machine learning models. The supervised validation dataset may be comprised of a plurality entries. Each entry may be associated with one or more features and corresponding feature values. Each entry may also have a corresponding label that indicates whether the entry is indicative of normal behavior or anomalous behavior.

One or more corresponding performance metrics may be determined for each of the trained and validated supervised machine learning models. For example, a number of false positives predicted by the one or more trained supervised machine learning models, a number of true positives predicted by the one or more trained supervised machine learning models, a number of false negatives predicted by the one or more trained supervised machine learning models, and/or a number of true negatives predicted by the one or more trained supervised machine learning models may be determined. In other embodiments, a percentage of the total predictions that are false positives, a percentage of the total predictions that are true positives, a percentage of the total predictions that are false negatives, and/or a percentage of the total predictions that are true negatives, may be determined. The one or more performance metrics may be compared to one or more corresponding performance thresholds.

Each trained and validated supervised machine learning model has an associated performance metric. One or more of the trained and validated supervised machine learning models may be selected to perform anomaly detection based on the associated performance metric. For example, the trained and validated machine learning model with the highest number of true positives, the highest number of true negatives, the lowest number of false positives, and/or the lowest number of false negatives may be selected. A top tier of trained and validated machine learning models may be selected (e.g., top 5 models, top 5% models, etc.)

Figure 5:
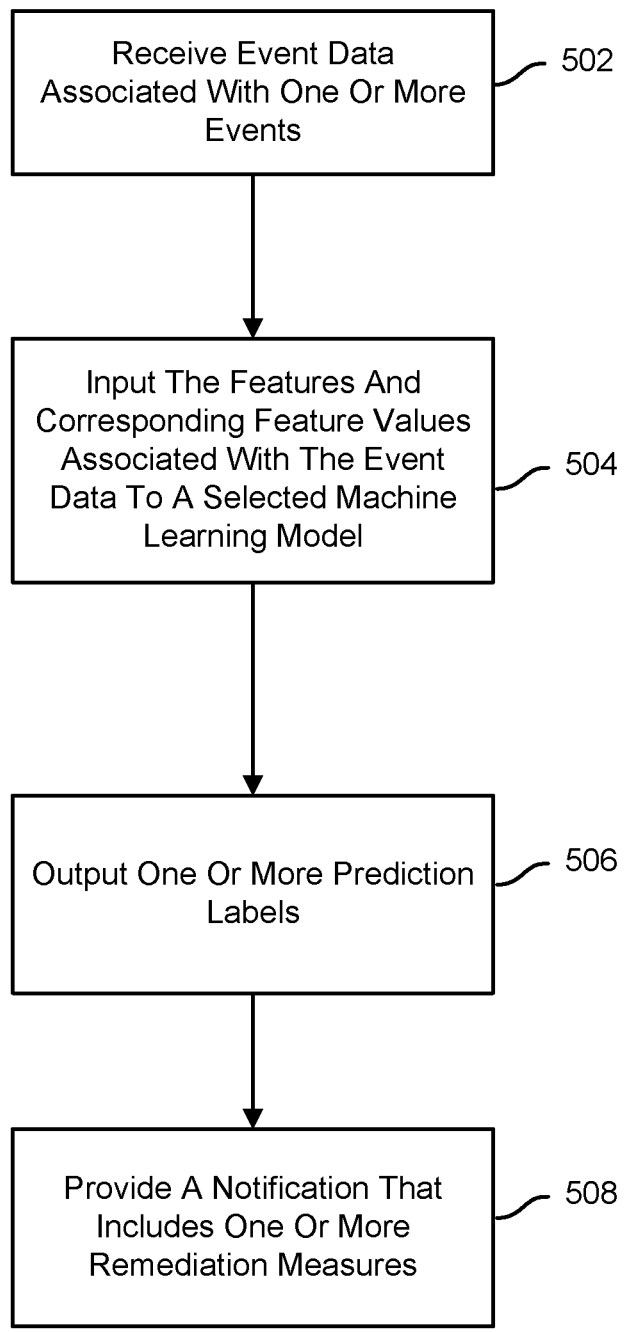
FIG. 5 is a flow chart illustrating a process for detecting anomalous behavior in accordance with some embodiments.

FIG. 5 is a flow chart illustrating a process for detecting anomalous behavior in accordance with some embodiments. In the example shown, process 500 may be performed by a system, such as anomalous behavior detection system 120.

At 502, event data associated with one or more events may be received. The event data may correspond to production data associated with a computing system. In some embodiments, the event data associated with one or more events is received on a periodic basis (e.g., hourly, daily, weekly, etc.). In other embodiments, the event data associated with one or more events is received after a threshold number of events have been performed by a computing system. In other embodiments, the event data associated with one or more events is received in response to a user command. The data associated with an event may include a plurality of features and corresponding feature values.

At 504, the features and corresponding feature values associated with the event data are inputted to a selected machine learning model. The selected machine learning model may correspond to a trained and validated supervised machine learning model with a particular performance metric. The same input could also be provided to a set of machine learning models and an aggregated score of these models could be considered for scoring.

At 506, the selected machine learning model outputs one or more prediction labels. The trained machine learning model may be configured to output a prediction label for each event included in the event data. In the event the selected machine learning model outputs a prediction label that indicates the one or more events are anomalous, a notification may be provided to a user associated with the computing system. A single model could be replaced with n different models where the aggregated score of these models could be considered for labeling an event as anomalous.

At 508, a notification that includes one or more remediation measures is provided. For example, the one or more recommended remediation measures may include a recommendation that a user associated with the computing system modify (e.g., strengthen) the user's password, a recommendation that a software patch be applied to a user's device, a recommendation that the user's device be restored to a particular point in time, a recommendation that a piece of software be uninstalled, etc. A recommended remediation measure may correspond to the specific type of anomalous behavior detected.

A recipient (e.g., a user associated with a computing system) of the notification may cause the one or more recommended remediation measures to be implemented. Using a combination of an unsupervised training dataset, an unsupervised machine learning model that enables the unsupervised training dataset to become a supervised training dataset, and using the supervised training dataset to train a supervised machine learning model, previously undetectable anomalous behavior may be detected and may enable anomalous behavior to be detected more accurately. This may allow the computing system to implement one or more remediation measures that may resolve or mitigate the damage associated with the anomalous behavior.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
using a training dataset to train an unsupervised machine learning trained model, wherein the trained unsupervised machine learning model is configured to generate a gradient range for a plurality of entries included in the training dataset;
determining corresponding gradient values for the plurality of entries included in the training dataset using the trained unsupervised machine learning model;
selecting a first subset of the training dataset based on the determined corresponding gradient values and a first threshold value selected from a set of threshold values;

removing one or more entries of the training dataset that are included in the gradient range, wherein a first boundary of the gradient range is equal to the first threshold value; and using a labeled version of the selected first subset to train a first supervised machine learning model to detect one or more anomalies.

2. The method of claim 1, further comprising:

selecting a second subset of the training dataset based on the determined corresponding gradient values and a second threshold value selected from the set of threshold values;

using a labeled version of the selected second subset to train a second supervised machine learning trained anomaly detection model; and selecting among a group of supervised machine learning trained models including at least the first trained supervised machine learning model and the second trained supervised machine learning model, a model based on one or more performance metrics of each of the supervised machine learning trained models in the group.

3. The method of claim 2, wherein the first threshold value and the second threshold value correspond to a gradient value included in the gradient range.

4. The method of claim 2, wherein the second threshold value is greater than the first threshold value.

5. The method of claim 2, wherein the second threshold value is less than the first threshold value.

6. The method of claim 2, further comprising receiving a production dataset associated with a computing system.

7. The method of claim 6, further comprising inputting one or more entries associated with the production dataset to the selected model, wherein the selected model is configured to output one or more corresponding prediction labels for the one or more entries associated with the production dataset.

8. The method of claim 7, further comprising providing a notification to a user device associated with the computing system in the event the one or more corresponding prediction labels indicate that at least one of the one or more entries associated with the production dataset is indicative of anomalous behavior.

9. The method of claim 8, wherein the notification includes one or more recommended remediation measures.

10. The method of claim 8, wherein the notification includes one or more reasons codes, wherein the one or more reason codes indicate one or more features and corresponding feature values included in the production dataset that are indicative of the anomalous behavior.

11. The method of claim 1, wherein the unsupervised machine learning trained model is a clustering algorithm.

12. The method of claim 1, wherein the first subset of the training dataset includes one or more entries that were not removed from the training dataset.

13. The method of claim 1, wherein an entry of the training dataset is labeled as being normal in the event a corresponding gradient value of the entry is less than the first threshold value and the entry of the training dataset is labeled as being anomalous in the event the corresponding gradient value is greater than the first threshold value.

14. The method of claim 1, further comprising applying a validation dataset to the first trained supervised machine learning model.

15. The method of claim 14, wherein the first trained supervised machine learning model is associated with one or more corresponding performance metrics based on the validation dataset being applied to the first trained supervised machine learning model.

16. The method of claim 15, wherein the one or more corresponding performance metrics include at least one of a number of false positives, a number of false negatives, a number of true positives, or a number of true negatives.

17. A system for detecting anomalous behavior, comprising:

a processor configured to:
  use a training dataset to train an unsupervised machine learning trained model, wherein the trained unsupervised machine learning model is configured to generate a gradient range for a plurality of entries included in the training dataset;
  determine corresponding gradient values for the plurality of entries included in the training dataset using the trained unsupervised machine learning model;
  select a first subset of the training dataset based on the determined corresponding gradient values and a first threshold value selected from a set of threshold values;
  remove one or more entries of the training dataset that are included in the gradient range, wherein a first boundary of the gradient range is equal to the first threshold value; and
  use a labeled version of the selected first subset to train a first supervised machine learning model to detect one or more anomalies; and a memory coupled to the processor and configured to provide the processor with instructions.

18. A computer program product for detecting anomalous behavior, the computer program product being embodied in a non-transitory computer readable storage medium and comprising computer instructions for:

using a training dataset to train an unsupervised machine learning trained model, wherein the trained unsupervised machine learning model is configured to generate a gradient range for a plurality of entries included in the training dataset;

determining corresponding gradient values for the plurality of entries included in the training dataset using the trained unsupervised machine learning model;

selecting a first subset of the training dataset based on the determined corresponding gradient values and a first threshold value selected from a set of threshold values;

removing one or more entries of the training dataset that are included in the gradient range, wherein a first boundary of the gradient range is equal to the first threshold value; and using a labeled version of the selected first subset to train a first supervised machine learning model to detect one or more anomalies.

* * * * *